United States Patent [19]
Davies et al.

[11] 4,236,243
[45] Nov. 25, 1980

[54] TELECOMMUNICATION SYSTEMS

[75] Inventors: David E. N. Davies, Hemel Hempstead; Stuart A. Kingsley, London, both of England

[73] Assignee: National Research Development Corporation, London, England

[21] Appl. No.: 29,532

[22] Filed: Apr. 12, 1979

[30] Foreign Application Priority Data

Apr. 20, 1978 [GB] United Kingdom ............... 15672/78

[51] Int. Cl.³ .............................................. H04B 9/00
[52] U.S. Cl. ...................................... 370/3; 332/7.51; 455/611; 455/615
[58] Field of Search ................... 370/3; 455/610, 611, 455/612, 615, 617; 332/7.51

[56] References Cited
U.S. PATENT DOCUMENTS

| | | | |
|---|---|---|---|
| 3,654,473 | 4/1972 | Nussmeier | 455/611 |
| 3,953,727 | 4/1976 | d'Auria | 370/3 |
| 4,002,896 | 1/1977 | Davies | 455/615 |

Primary Examiner—Howard W. Britton
Attorney, Agent, or Firm—Cushman, Darby & Cushman

[57] ABSTRACT

A telecommunication system has a laser-energized multimode optical fibre highway. Data is entered on to the highway by means of a series of modulators each operating at a different subcarrier frequency. At the far end of the highway demodulation is carried out be a quadrant photodetector which applies each of its outputs to a respective set of channels. Each channel in a set has a band pass filter centered on a subcarrier frequency followed by a non-linear device. The signals from all the channels of different sets carrying the same subcarrier frequency are combined and the signals passed through band pass filters centered on the second harmonic of the subcarrier frequency.

9 Claims, 4 Drawing Figures

TELECOMMUNICATION SYSTEMS

This invention relates to telecommunication systems and has particular application to telecommunications systems employing modulated optical signals.

According to the invention there is provided a telecommunications system comprising a multimode optical fibre highway, a source of coherent electromagnetic radiation of optical frequency at one end of the highway, a plurality of modulators spaced along the highway each comprising means for modulating an individual subcarrier signal with a data signal and means for periodically varying the optical path length of a short section of the highway with the modulated subcarrier signal, and demodulating means connected to the other end of the highway said demodulating means comprising photodetector means, a plurality of channels selective to individual ones of the subcarrier frequencies and each of said channels including a non-linear device, a filter responsive to an even harmonic of the subcarrier in that channel, and an FM demodulator.

Preferably the said filter is responsive to the second harmonic of the subcarrier.

In carrying out the invention the photodetector means may be a multiple detector having two or more discrete areas each sensitive to different parts of the cross-section of the light beam from the fibre. Preferably four such areas or quadrants are used.

A separate set of channels is associated with the signals from each area of the photodetector and the channels of corresponding subcarriers from the different detector areas are combined before the second harmonic filters.

The source of radiation may be a gas laser or a solid state light source of adequate coherence.

In order that the invention may be more fully understood, reference will now be made to the accompanying drawing in which.

Figure 1:
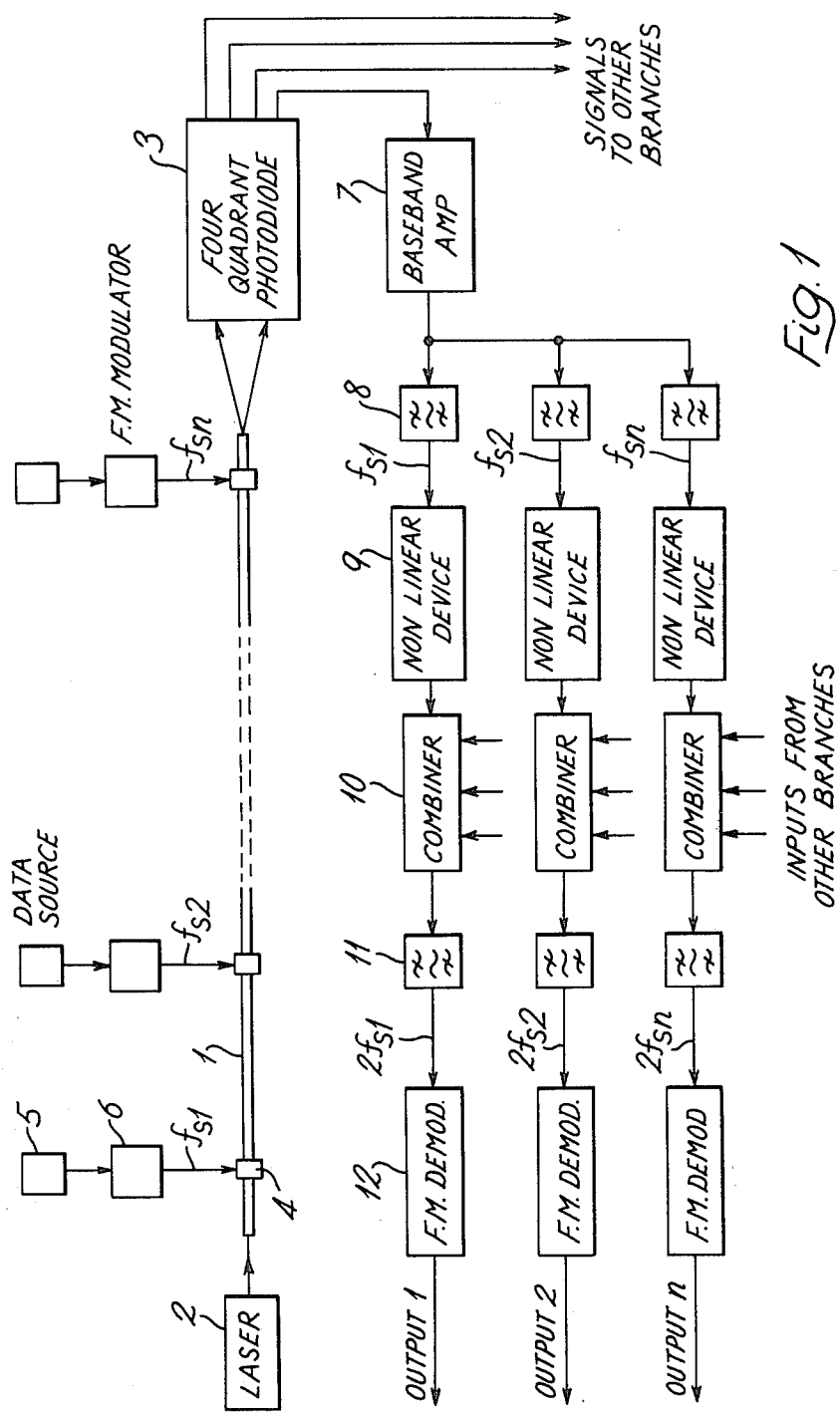
FIG. 1 illustrates in block diagrammatic form an embodiment thereof.

Referring now to FIG. 1 there is shown therein a length of optical fibre 1 functioning as a multimode fibre. A laser 2 is coupled to supply electromagnetic radiation of optical frequency to one end of fibre 1 while at its opposite end there is provided a four quadrant photodiode 3. Spaced along fibre 1 there is provided a plurality of modulators for enabling information to be impressed on the optical signal propagated along the fibre. These modulators are in the form of clip-on acoustic transducers 4. An example of such a transducer is described with reference to FIGS. 2, 3 and 4 and functions to phase modulate the optical carrier signal. The data to be carried by the highway is derived from sources such as source 5 and the data are applied to modulators 6 each modulating a separate subcarrier of frequency fs1, fs2 etc. Modulators 6 are preferably frequency or phase modulators.

At the far end of the optical highway the light from the fibre is directed on to the four quadrant photodiode 3. This device has four sensitive areas each covering approximately one quadrant of the cross-section of the beam directed thereon. The outputs from each of the quadrants of photodiode 3 are taken to separate sets of channels. One such set of channels is illustrated in the figure. It comprises a base band amplifier 7 which amplifies the entire spectrum of signals obtained from one of the quadrants and the output of amplifier 7 is then applied to individual channels of the set each of which commences with a band pass filter 8 centered on an individual one of the subcarrier frequencies. Thus the signal in each channel comprises an individual modulated subcarrier signal.

The signals in the channels are applied to non-linear circuits 9 which generate harmonics of the subcarrier and in particular the second harmonic thereof. The outputs of the non-linear circuits are then applied to combiner circuits 10 in which the signals from the corresponding channels of each set are combined together to form a single channel. The output of a combining circuit 10 is then applied to a further filter 11 which passes an even harmonic only of the subcarrier signal, for example the second harmonic as shown in FIG. 1. These second harmonic signals are then demodulated in FM demodulators 12 the outputs of which constitute signals representing the input signals from the data source 5.

In operation of the system illustrated in FIG. 1 the effect of the multimode propagation in the optical signal in fibre 1 will be to convert the phase modulation impressed on the optical carrier into amplitude (envelope) modulation. This resulting amplitude modulated signal will be directly detected in the quadrants of the photodiode without the need for a separate reference signal.

It can be shown that the signals recovered from the photodiode are bipolar in phase, that is to say that assuming negligible fibre dispersion there exists only two phases for the recovered subcarrier signals. This polarity reversal is random in nature so that if the signals from two or more quadrants are combined they are likely to cancel each other out in a random manner and would not enhance the signal available from a single photodiode. However in view of the bipolarity if the second harmonic of the subcarrier signals are taken then the resultant frequency doubled signals will all be in phase with each other.

Where multimode propagation is utilised the interaction between the modes causes fading and sensitivity to movement of the fibre. However space diversity detection by the use of a sectioned photodiode eliminates much of the effect of such interaction since the fading of signals will be uncorrelated between the separate quadrants of the photodiode.

Figure 2:
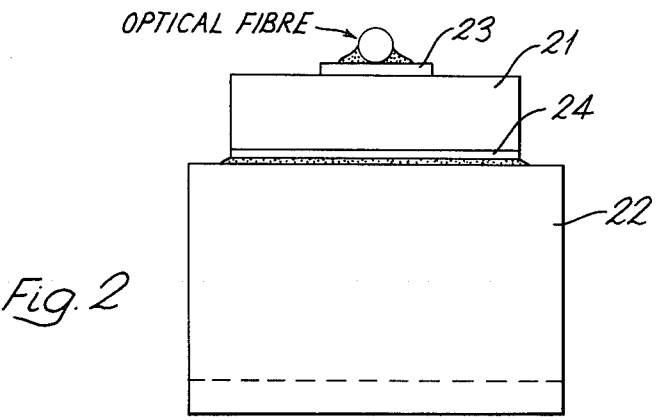
FIG. 2 illustrates a detail of a transducer assembly.
Figure 3:
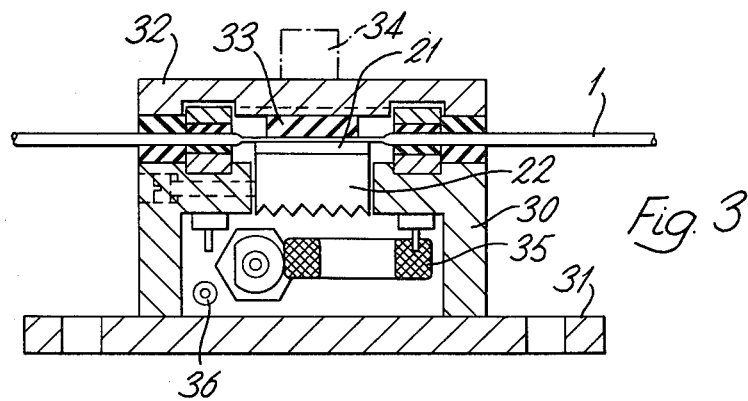
FIG. 3 illustrates a transducer assembly in cross-section.
Figure 4:
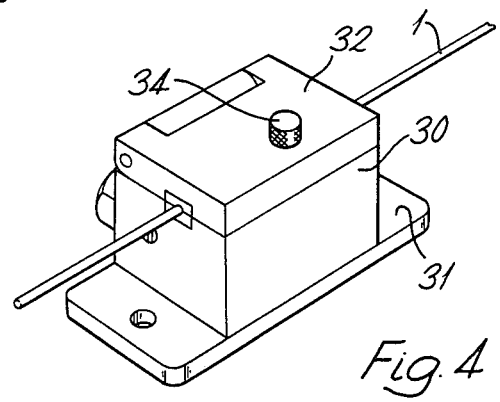
FIG. 4 is a perspective view of the transducer assembly of FIG. 3.

An example of a suitable transducer assembly is shown in FIGS. 2, 3 and 4. Since the optical fibre highway functions by utilising differential phase modulation between modes to produce amplitude modulation, this effect is encouraged by the use of an acoustic transducer that applies asymmetric radial strain to the fibre. This induces transverse, or radial, birefringency and hence phase-modulates orthogonally polarised modes with different depths of modulation. Basically the optical fibre, which may have its plastic coating stripped over a short length, is clamped to a piezoelectric plate so as to produce strain in the fibre in a direction predominantly normal to the plate but not in a direction parallel to the plane of the plate.

A detail of the transducer assembly is shown in FIG. 2. It comprises a piezoelectric plate transducer 21 bonded to a small block 22 of metal or plastic which acts as a mount. The plate may be initially supplied with upper and lower electrodes 23 and 24 or else may have a lower electrode only and is then bonded to block 22 and then polished down to the required thickness for resonance on the mount after which the top electrode is applied. The mount itself forms the ground connection to the lower electrode of the piezoelectric plate and when a plastic mount is used a conducting layer is deposited on its surface. The mount also provides acoustic clamping of the transducer for bandwidth broadening purposes. In use the optical fibre 1 is clamped to the top of the piezoelectric plate 21. Fibre 1 may be bared but in general this is not necessary. A suitable grease for temporary coupling or epoxy resin for permanent coupling may be used between fibre 1 and plate 21. Mount 22 may be constructed of perspex or cast-iron and may have a tapered or serrated base for scattering any acoustic signals which are not sufficiently attenuated. The piezoelectric plate can be constructed of quartz or lithium niobate.

The complete transducer assembly as shown in cross-section in FIG. 3 comprises a housing 30 secured to a mounting plate 31 and containing a toroidal ferrite matching transformer 35 supplied with the input signal, a tuning inductor 36 for electrical tuning of the piezoelectric transducer, the mount 22 and transducer 21 bonded thereto is secured in the top of the housing and the optical fibre 1 is laid above it. A hinged lid 32 is swung down above the fibre and a rubber pressure pad 33 is interposed. Lid 32 is held down by a clamping screw 34. The complete assembly is shown in perspective in FIG. 4.

Since the modulation of the optical signals in the fibre is in response to an applied acoustic pressure wave, it is also possible to incorporate a single data input channel (at base-band) which does not employ a subcarrier oscillator. In this instance, a short length of optical fibre may operate as an acoustic sensor (this is a known property of optical fibres carrying coherent optical signals). The acoustic signals will produce corresponding phase modulation of the optical carrier which again appears as amplitude (envelope) modulation at the photodiode. Fading of the acoustically detected signal due to the multimode propagation in the optical fibre may again be reduced by combining the second harmonic of the signals received on separate sections of the photodiode.

We claim:

1. A telecommunications system comprising a multi-mode optical fibre highway, a source of coherent electromagnetic radiation of optical frequency at one end of the highway, a plurality of modulators spaced along the highway each comprising means for modulating an individual subcarrier signal with a data signal and means for periodically varying the optical path length of a short section of the highway with the modulated subcarrier signal, and demodulating means connected to the other end of the highway said demodulating means comprising photodetector means, a plurality of channels selective to individual ones of the subcarrier frequencies and each of said channels including a non-linear device, a filter responsive to an even harmonic of the subcarrier in that channel, and an FM demodulator.

2. The system as claimed in claim 1 in which the said filter is responsive to the second harmonic of the subcarrier.

3. The system as claimed in claim 1 in which the photodetector means is a multiple detector having at least two discrete areas each sensitive to different parts of the cross section of the light beam from the fibre.

4. The system as claimed in claim 3 in which the detector has four of the said areas each positioned in quadrant.

5. The system as claimed in claim 3 or claim 4 in which a separate set of channels is associated with the signals from each area of the photodetector and the channels of corresponding subcarriers from the different detector areas are combined before the filters.

6. The system as claimed in claim 1 in which said modulators each comprise transducers coupled to the optical fibre highway so as to phase modulate the optical signal.

7. The system as claimed in claim 6 in which the said transducers are acoustically coupled to the highway.

8. The system as claimed in claim 7 in which said transducers comprise clip-on devices which are attached to the highway without severing the optic fibres.

9. The system as claimed in claim 7 or claim 8 in which the transducers each have a piezoelectric element for applying strain to the optic fibres.

* * * * *